United States Patent [19]

Uchida

[11] 4,445,682

[45] May 1, 1984

[54] ORIGINAL CIRCULATING AND CONVEYING DEVICE FOR COPYING MACHINE

[75] Inventor: Hiroyasu Uchida, Kanagawa, Japan

[73] Assignee: Fuji Xerox Co., Ltd., Tokyo, Japan

[21] Appl. No.: 366,615

[22] Filed: Apr. 8, 1982

[30] Foreign Application Priority Data

Jun. 8, 1981 [JP] Japan .................................. 56-86912

[51] Int. Cl.³ ............................................ B65H 29/58
[52] U.S. Cl. ................................ 271/301; 355/14 SH; 355/102
[58] Field of Search ........................... 271/301, 291, 3; 355/102, 109, 14 SH

[56] References Cited

U.S. PATENT DOCUMENTS 3,770,348  11/1973  Martin ................................. 271/301
4,072,305   2/1978  Scheid ................................. 271/301

*Primary Examiner*—Richard A. Schacher
*Attorney, Agent, or Firm*—Sughrue, Mion, Zinn, Macpeak and Seas

[57] ABSTRACT

A document conveying device having the capability of varying its recirculation path length in accordance with measured document size disables its recirculating path whenever a document exceeds a predetermined size.

5 Claims, 2 Drawing Figures

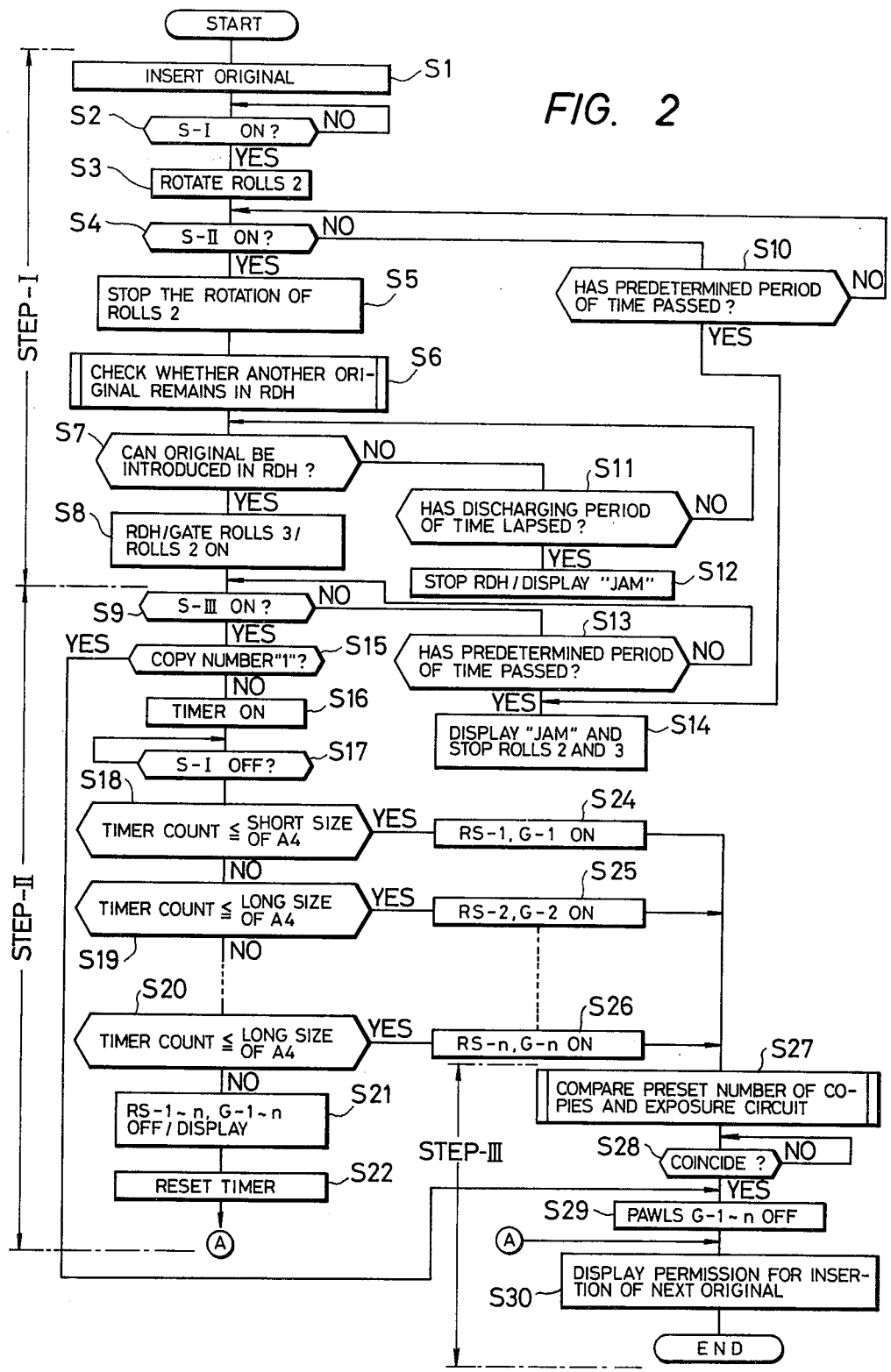

4,445,682

ORIGINAL CIRCULATING AND CONVEYING DEVICE FOR COPYING MACHINE

BACKGROUND OF THE INVENTION

This invention relates to an original circulating and conveying device (hereinafter referred to as "an RDH" for Recycle Document Handler) for use with a copying machine.

The RDH is a device suitable for continuously handling either a number of original documents or a long-sided original, which has a wide range of applicability. Therefore, the RDH is extensively employed as an original handling device for high-grade and large document copying machines.

The invention relates to an improvement in an RDH of the type in which a stationary optical system is provided to mainly handle a long size original, such as a drawing, and in which the original is scanned and exposed while being conveyed.

A drawback accompanying a conventional RHD is that the efficiency is considerably low in the case where only one original much shorter than the length of the RHD original circulating path is inserted (this is the case that occurs most frequently in a generally used copying machine) and a number of copies are obtained by continually recirculating the original through a path which is much longer than necessary. This had led to the development of a variable length RDH disclosed in copending and commonly assigned U.S. patent application Ser. No. 332,777, the disclosure of which is herein incorporated by reference. In such a system, the size of the original is measured and the circulation path length is controlled in accordance with the document size.

The RDH of this type is disadvantageous in that the length of an original to be handled is limited, and if an original longer than the limit value is inserted, it is liable to cause the RDH to jam. Further, a multitude of detecting elements are required to detect the document size.

SUMMARY OF THE INVENTION

Accordingly, an object of this invention is to provide an RDH having a wide range of circulating path sizes in which the above-described drawbacks accompanying a conventional RDH or variable path length RDH are eliminated. More specifically it is an object of this invention to provide an RDH in which an original is prevented from being jammed in the RDH due to an operator's careless operation or due to an oversized original being used.

In order to achieve the foregoing object, an RDH according to this invention includes means for detecting the length of an original inserted therein, and means for selecting an optimum conveying path in accordance with the original's length thus detected. The RDH of the invention further includes means for discharging an original after the latter is exposed only once, irrespective of the number of copies which has been preset, when an original having a length larger than the maximum length of the circulating path is inserted.

BRIEF DESCRIPTION OF THE DRAWINGS

An embodiment of this invention will be described with reference to the accompanying drawings, in which:

FIG. 2 is a flow chart for controlling the original circulating and conveying device of the invention.

DETAILED DESCRIPTION OF THE INVENTION

Figure 1:
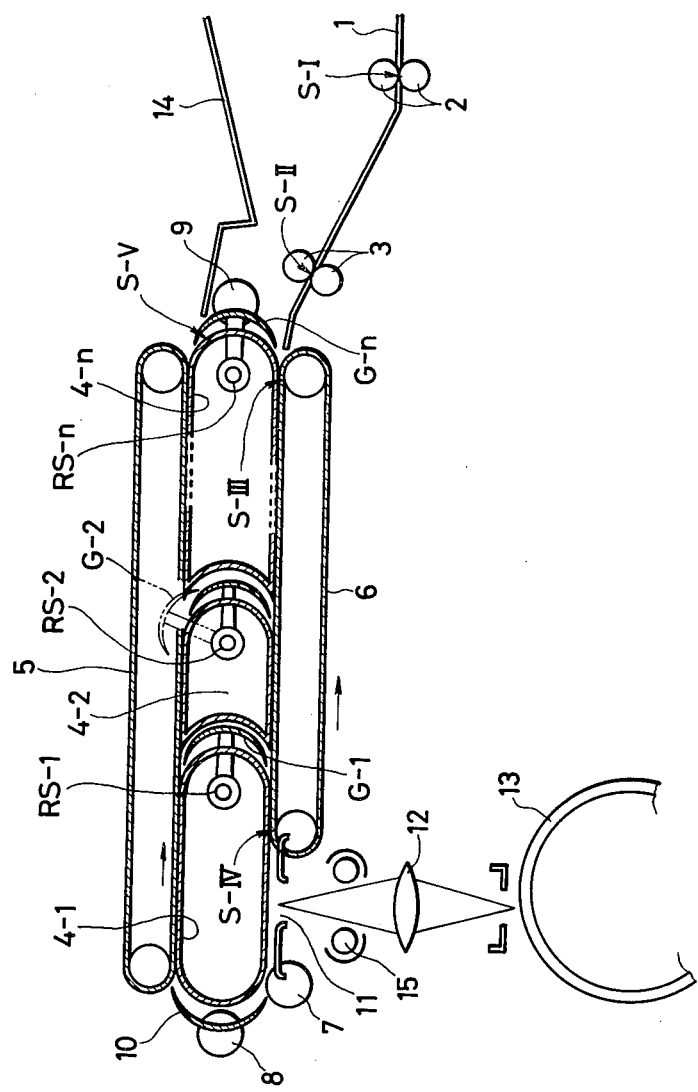
FIG. 1 is a side view outlining one embodiment of an original circulating and conveying device according to this invention.

FIG. 1 is an explanatory diagram showing the arrangement of one embodiment of an RDH according to the invention. In FIG. 1, an original insertion stand 1 is provided at one end of an original circulating device. The operator puts thereon an original to be inserted.

Provided inward of the original insertion stand 1 are a first sensor S-I for detecting the width of the original inserted and a pair of rolls 2 for forwarding the inserted original. Provided inward of the pair of rolls 2 are a second sensor S-II for detecting the front edge of the original and a pair of gate rolls 3 for temporarily stopping the front edge of the original in order to ensure original insertion timing.

An original drawing section of the RDH original circulating mechanism is provided inward of the pair of gate rolls 3. The rotational speed of the pair of rolls 2 for inserting the original is selected to a suitable value so that the operator can readily insert the original.

The RDH original circulating mechanism has a series of generally elliptic metal drums 4-1, 4-2, . . . and 4-n which are disposed in the central part of the mechanism. These drums are completely grounded and are arranged with a small spacing between adjacent drums. Pawls G-1, G-2, . . . and G-(n−1) are provided in the spaces between the drums in such a manner that they are upwardly projectable and downwardly retractable. The same type of pawl G-n is provided at the rear end of the drum 4-n which is located at the end of the RDH original circulating mechanism. These pawls G-1 through G-n are selectively driven by a suitable drive means, such as rotary solenoids RS-1, RS-2, . . . and RS-n, respectively.

Endless belt conveying assemblies 5 and 6 are provided on both sides of the series of drums 4-1 through 4-n in such a manner that they move in sliding contact with the surfaces of the drums. The moving speeds of the belts 5 and 6 are adjusted so as to be suitable for the exposure of an original.

Each of the endless belt conveying assemblies 5 and 6 is made up of a plurality of endless belts which are arranged at certain intervals in the widthwise direction of the series of drums 4-1 through 4-n. Therefore, the top portions of the pawls G-1 through G-n can be projected into and retracted from the gaps between the endless belts. Due to the pawls thus provided, the RDH is capable of changing the original conveying path.

Conveying rolls 7, 8 and 9 are respectively provided beside the front end (the left end in FIG. 1) and the rear end (the right end in FIG. 1) of the series of drums 4-1 through 4-n so that the original is conveyed along the curved surfaces of the frontmost drum and of the rearmost drum. A guide 10 is further disposed in front of the frontmost drum 4-1 to aid in the changing of the conveyance direction of the original.

A third sensor S-III for detecting the front edge of the original is provided inside the original drawing section formed by the endless belt conveying assembly 7 and the rearmost drum 4-n. A fourth sensor S-IV is disposed near the innermost end of the belt assembly 6 but before an exposure scan section. An original scan exposure window 11 is provided between the fourth sensor S-IV and the aforementioned roll 7.

The original supplied from the original insertion stand 1 is conveyed to the exposure window 11 by the belt conveying assembly 6 so that the image of the original thus conveyed is formed on a photo-sensitive drum 13 with the aid of exposure lamps 15 and an optical system 12. After a scan exposure process, the direction of conveyance of the original is changed by the guide 10 and the original is delivered to an original discharging tray 14 through an opening between the endless belt conveying assembly 5 and the rearmost drum 4-n. In this operation, the original conveyance condition is checked by a fifth sensor S-V which is disposed near the base of the original discharging tray 14.

The RDH constructed and operated as described above is preferably controlled by a microcomputer. The operation of the RDH will be described with reference to a flow chart shown in FIG. 2.

FIG. 2 explains the sequence of the operations of the sensors and gates provided in the RDH. The steps in the flow chart can be divided roughly into STEP-1 for determining whether or not an original can now be inserted into the RDH, STEP-II for detecting the length of the inserted original and selecting the optimum circulation path, and STEP-III for discharging the original and for preparing to receive the next original.

In STEP-I, the operator usually sets the number of desired copies after placing the original on the original insertion stand 1, however, an unskilled operator may insert the original immediately. Therefore, it is desirable that the programming is arranged so that the set number of copies is not detected before the commencement of STEP-II. When an original is inserted by the operator (S1 in FIG. 2), the front edge of the original abuts the first sensor S-1, thereby turning on the latter S-1. When the turning on of the first sensor S-1 has been confirmed (S2), the pair of rolls 2 for forwarding the original are rotated in response to the output signal of the sensor S-1 (S3). Thereafter, the front edge of the original reaches the second sensor S-II to turn on the latter S-II. When this is confirmed in Step S4, the rotation of the rolls 2 is stopped by the output signal of the second sensor S-II (S5).

In the case where the second sensor S-II is not operated within a predetermined period of time, it is determined in Step S10 that jamming has occurred in the insertion path. In this case, Step S14 is effected so that the occurrence of jamming is indicated and simultaneously the rotation of the rolls 2 is stopped.

In order to drive the pair of gate rolls 3 to further convey the original, it is necessary to check whether or not the previously inserted original remains in the RDH (S6). This check is carried out according to the relationships between the on-off operations of the fourth and fifth sensors S-IV and S-V and the preset number of copies, e.g. by counting the number of times sensors S-IV and S-V have been energized and subtracting from this the desired number of copies, and is included in a sub-routine in the flow chart. The detailed description of the sub-routine is omitted herein for simplification of the description, since it is a simple operation which would be well within the skill of the ordinary artisan, and since the sub-routine per se does not constitute a part of the invention.

If an original still exists in the RDH and it is not permissable to introduce another original, the latter is held at the pair of gate rolls 3. However, if no instruction is issued to drive the gate rolls 3 despite the passage of a predetermined period of time within which the original should have been discharged out of the RDH, it is determined that jamming has occurred in the RDH. In this case, the overall RDH is stopped, and the stop of the RDH is indicated (S11 and S12).

When, in Step S7, a signal is provided to permit the insertion of the original, the gate rolls 3 and the rolls 2 start rotation (S8) to introduce the original into the RDH original circulating mechanism.

If the original which has been inserted before that original does not remain in the RDH, then the original circulating mechanism which has been stopped starts operation. This concludes the operation of STEP-I.

The front edge of the original, passing through the gate rolls 3, is detected by the third sensor S-III located near the entrance of the original circulating mechanism (S9), so that STEP-II for detecting the length of the original is effected. When the third sensor S-III does not detect the original despite the lapse of a predetermined period of time (S13), it is determined that jamming has occurred in the original inserting section. The occurrence of jamming is indicated and simultaneously the rotation of the rolls 2 and 3 are stopped (S14).

After the third sensor S-III detects the front edge of the original, it is detected whether or not the number of copies is "1" in Step S15. If affirmative, then Step S29 is effected. In Step S29, the pawls G-1 through G-2 are retracted so that the original is discharged after being exposed only once. Then, in Step S30, the permission for the insertion of the next original is indicated.

When the number of copies is more than "1", the operation advances to Step S16 so that a timer is operated to measure the length of the original. The length of the original can be determined by measuring, with the output pulse of the timer, the time interval which elapses from the instant that the front edge of the original is detected by the third sensor S-III until the rear edge of the original passes the first sensor S-I (S17). Alternatively, the length of the original can also be determined by measuring the timer interval which elapses from the instant that the front edge of the original is detected by the third sensor S-III or any other sensor until the rear edge of the original is detected by the same sensor. The flow chart in FIG. 2 shows the case where the length of the original is detected by the third and first sensors S-III and S-I.

Thus, the length of the original can be represented by a count value of the timer. The count value of the timer is compared with a reference value corresponding to a sheet size in step S18, S19 or S20. According to the comparison result, one of the pawls G-1 through G-n, which is most suitable for handling the length of the original, is actuated so as to form the optimum (i.e. shortest) path for circulating the original. For instance, in the case when the length of the original inserted is smaller than the short side of size "A4", the condition in step S18 is satisfied, and therefore Step S24 is effected. In Step S24, the rotary solenoid RS-1 is energized to project the pawl G-1 upwardly to form the shortest circulation path.

When the length of the original inserted is shorter than the long side of size "A4" but longer than the short side of size "A4", then the condition in Step S18 is not satisifed but the condition in Step S19 is satisfied. Therefore, Step S24 is effected. In step S25, the rotary solenoid RS-2 is energized to raise the pawl G-2 so that the latter is inserted into the gap between the endless belts forming the belt assembly 5. As a result, the original is circulated along an original circulating path which is provided along the drums 4-1 and 4-2.

When the length of the original is longer than the total circumferential length of the series of drums 4-1 through 4-n, the conditions in steps S18 through S20 are not satisfied, and therefore step S21 is effected. In step S21, all the rotary solenoids RS-1 through RS-n are turned off, and accordingly all the pawls G-1 through G-n are maintained retracted at the rear ends of the drums 4-1 through 4-n, respectively. At the same time, the fact that the original's length is over the allowable limit is indicated. As a result, the original is delivered to the original discharging stand 14 after being exposed only once. In succession with this, the timer for detecting the original's length is reset in step S22. The operation advances to step S30, in which the permission for the insertion of the next original is indicated.

When an original circulating path is determined in Steps S24 through S26, the operation advances to Step S27 in STEP-III for discharging the original. Step S27 is performed by a simple sub-routine which need not be described in detail. In Step S27, the number of copies can be detected and counted, for instance, by the sensor S-IV. When the count value reaches a preset value, in response to a coincidence signal provided in Step S28 all of the pawls G-1 through G-n which have been projected into the gaps of the belt assembly 5 are retracted, so that the original is delivered to the original discharging tray.

As is apparent from the foregoing description, according to the invention, an optimum circulating path or a shortest circulating path is formed selectively in accordance with an original's length, and therefore the RDH can be efficiently operated. Furthermore, even when the original having a length longer than the longest circulating path is inserted, it will not cause the RDH to jam.

In the case where it is desired to obtain plural sets of copies by inserting a number of small size originals, the RDH can be readily designed so that the original's length measuring function is not operated depending on the operator's decision. It is apparent that the applicability of the RDH of the invention is enhanced by designing the RDH as described above.

Since the RDH is contructed as described above, the occurrence of jamming in the RDH due to the operator's simple careless insertion of a longer original can be prevented, and an optimum conveyance path is automatically selected according to the length of the original inserted. Thus, the invention is remarkably effective in improving the efficient use of the RDH and accordingly the copying efficiency.

What is claimed is:

1. A recirculating document handling apparatus for a copying machine of the type wherein a plurality of copies of a document are obtained by repeatedly transporting said document past an exposure station until a desired number of exposures of said document have been made, said handling apparatus comprising:
   conveying means for conveying a document from a document insertion position to a document discharge position along a conveying path past said exposure position;
   detection means for detecting the size of said document; and
   recirculating means for selectively recirculating said document back to said exposure station through a recirculation path before it reaches said discharge position until said desired number of copies have been made, said recirculating means being responsive to said measured document size to vary the length of said recirculation path, said recirculating means being disabled to thereby permit said document to be forwarded to said discharge position without recirculation after only one exposure has been made regardless of the number of exposures desired when said detection means detects that said document exceeds a predetermined size.

2. An apparatus as claimed in claim 1, wherein said detection means comprises means for detecting a leading edge of said document and for detecting the trailing edge of said document and timing means for measuring the lapse of time between the detection of said leading and trailing edges.

3. An apparatus as claimed in claim 2, wherein said means for detecting comprises first and second detectors for detecting said leading edge at a first position and said trailing edge at a second position.

4. An apparatus as claimed in claim 2, wherein said means for detecting detects said leading and trailing edges at the same position.

5. An apparatus as claimed in claim 1, wherein said conveying means includes a plurality of belts for contacting said document and urging said document toward said discharge position from said exposure position, said plurality of belts being spaced apart in a direction transverse to said conveying path with at least one gap therebetween, and said recirculating means includes at least one document deflector retractable from and insertable into said conveying path, said at least one document deflector extending into said at least one gap when inserted into said conveying path.

* * * * *